United States Patent [19]

Gallios et al.

[11] Patent Number: 4,639,844
[45] Date of Patent: Jan. 27, 1987

[54] RESONANT CURRENT DRIVEN POWER SOURCE FOR LOW INPUT VOLTAGES

[75] Inventors: George C. Gallios, Setauket; Charles Lien, Huntington, both of N.Y.

[73] Assignee: Venus Scientific Inc., Farmingdale, N.Y.

[21] Appl. No.: 637,779

[22] Filed: Aug. 6, 1984

Related U.S. Application Data

[63] Continuation-in-part of Ser. No. 417,465, Sep. 13, 1982, Pat. No. 4,475,149.

[51] Int. Cl.$^4$ .............................................. H02M 3/335
[52] U.S. Cl. ........................................ 363/17; 363/24; 363/133
[58] Field of Search ................... 363/24, 25, 26, 17, 363/95, 97, 98, 132, 133, 134, 41

[56] References Cited

U.S. PATENT DOCUMENTS

| | | | |
|---|---|---|---|
| 3,921,197 | 11/1975 | Horvath | 363/97 X |
| 3,970,916 | 7/1976 | Kienscherf | 363/41 X |
| 4,251,857 | 2/1981 | Shelly | 363/26 |
| 4,254,459 | 3/1981 | Belson | 363/24 X |
| 4,475,149 | 10/1984 | Gallios | 363/132 X |

FOREIGN PATENT DOCUMENTS 656162 4/1979 U.S.S.R. ............................ 363/25

Primary Examiner—Philip H. Leung
Attorney, Agent, or Firm—Ostrolenk, Faber, Gerb & Soffen

[57] ABSTRACT

A resonant current-driven power source is disclosed. Preferably, the power source is a DC to DC converter regulator including a inductor and capacitor electrically coupled to one another and an input inverter which converts an input DC voltage into an AC voltage having substantially no DC component and applies the AC voltage across an LC circuit in a manner which causes the inductor and capacitor of the latter to resonate with one another whereby an AC voltage appears across the capacitor. An output circuit converts the AC voltage appearing across the capacitor into a DC output voltage. A control circuit is provided for controlling the operation of the inverter circuit in a manner which controls the magnitude of the output voltage. The inverter circuit also includes a step-up transformer for increasing the magnitude of the AC voltage across the LC circuit to a value many times greater than the input DC voltage.

21 Claims, 9 Drawing Figures

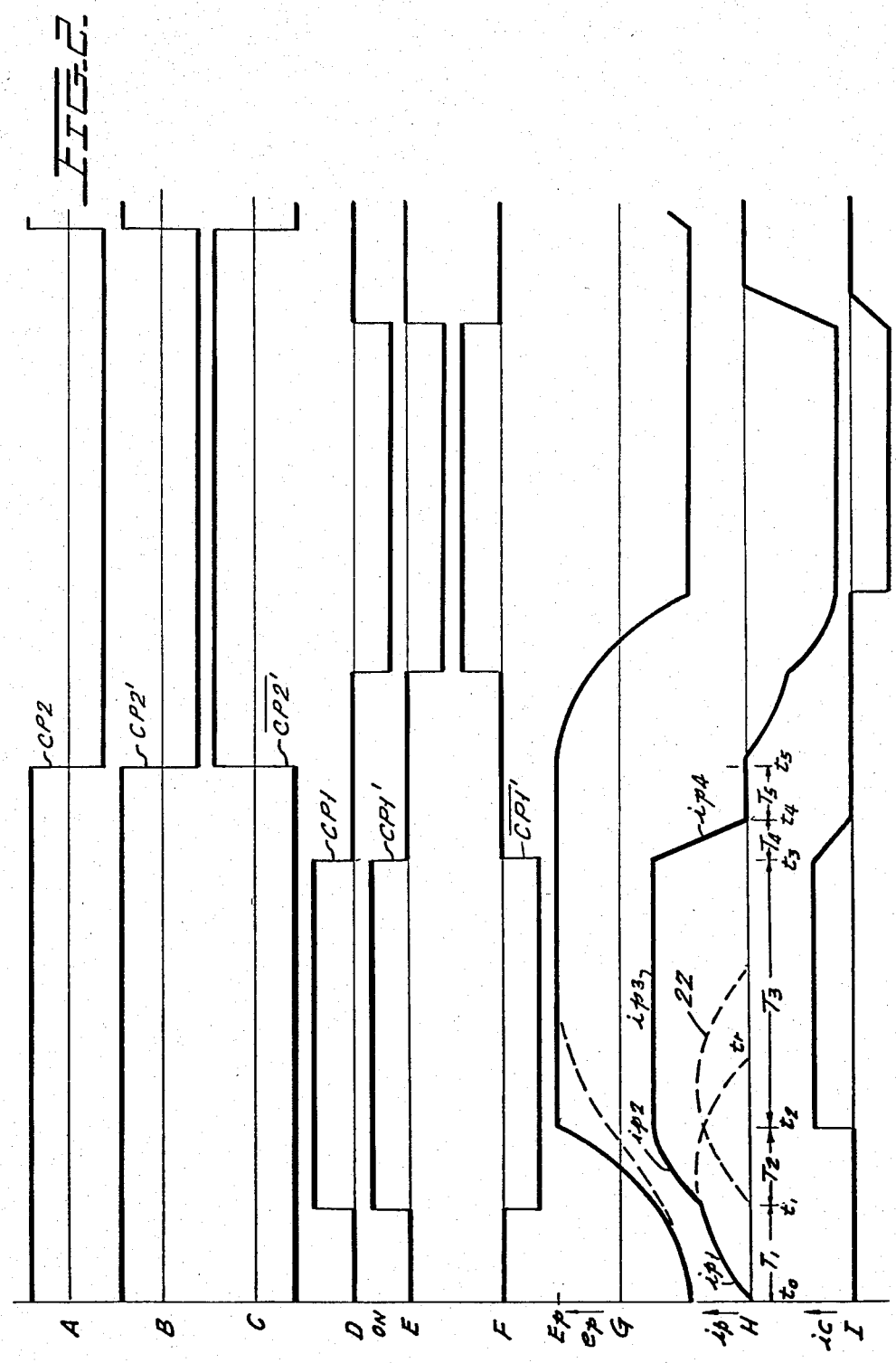

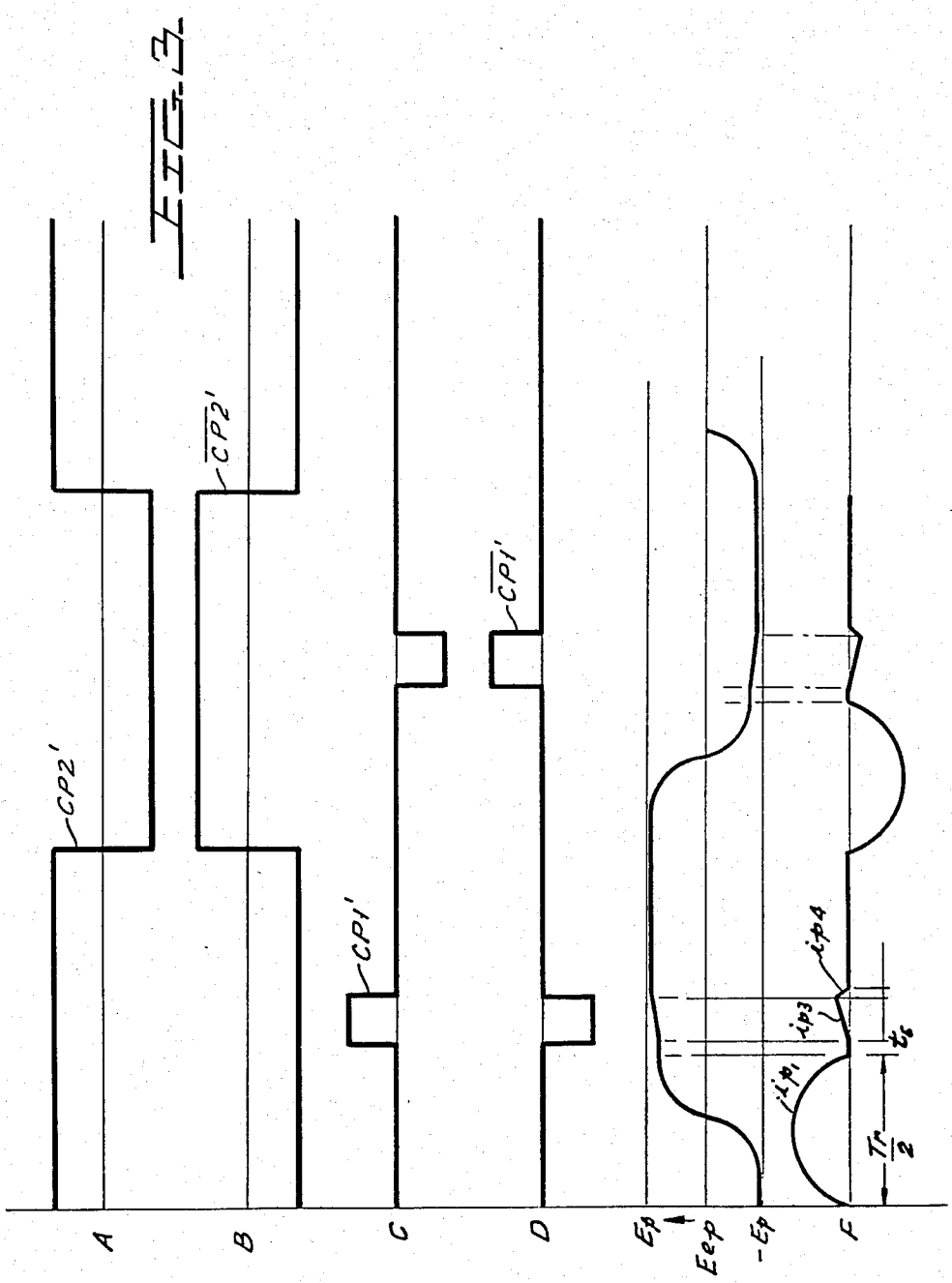

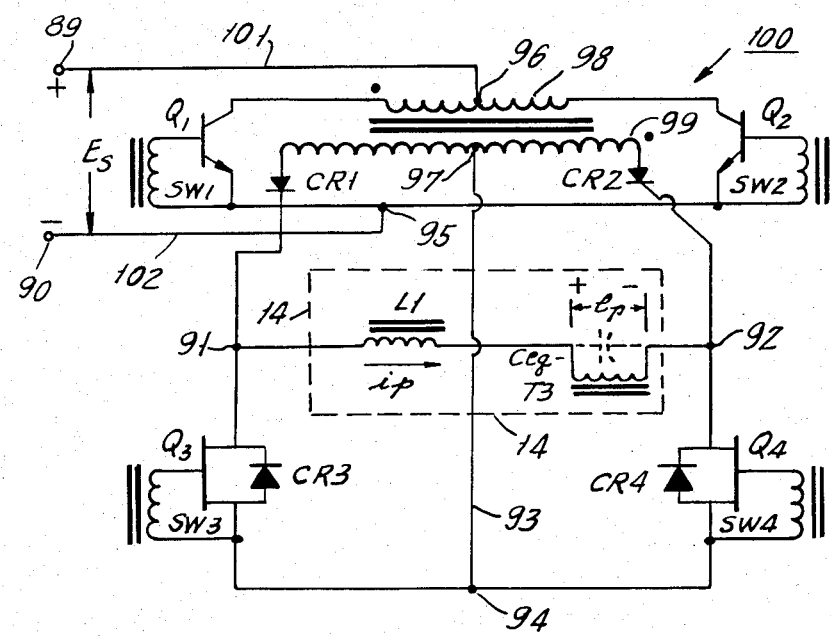
FIG. 6.
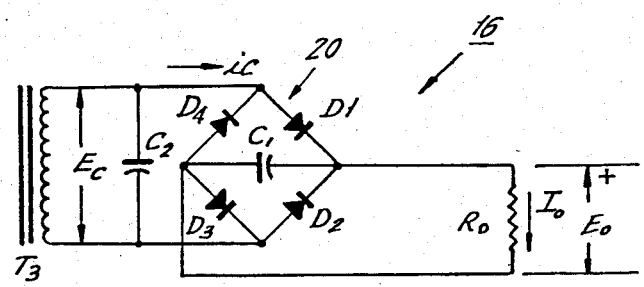
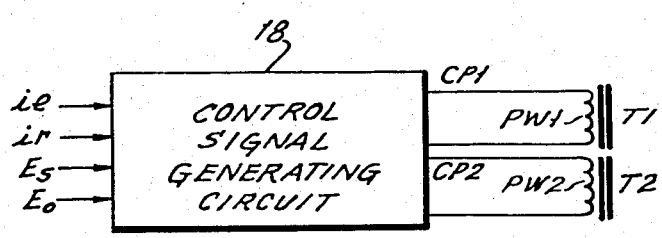

RESONANT CURRENT DRIVEN POWER SOURCE FOR LOW INPUT VOLTAGES

CROSS-REFERENCE TO RELATED APPLICATION

This is a continuation-in-part of U.S. patent application Ser. No. 417,465, filed Sept. 13, 1982, now U.S. Pat. No. 4,475,149.

BACKGROUND OF THE INVENTION

1. Field of the Invention

The present invention is directed towards a power source and, more particularly, to an improved resonant current driven power source of the type disclosed in copending U.S. patent application Ser. No. 417,465 of George C. Gallios, filed Sept. 13, 1982, U.S. Pat. No. 4,475,149 for a "Resonant Current-Driven Power Source", and assigned to the assignee of the instant invention. In the presently preferred embodiment, the power source is constructed as a DC to DC converter regulator having a relatively low input voltage and delivering relatively high output power.

2. Description of the Prior Art

As explained in greater detail in the aforesaid application Ser. No. 417,465, converters of the prior art fall into two primary categories: voltage-driven converters and current-driven converters. A typical voltage-driven converter comprises four switching transistors which are connected between a source voltage and the primary winding of a transformer. A control circuit applies inverse square waves to the transistors so they operate in a saturated square wave power "chopper" mode to induce an AC voltage across the primary winding of the transformer. This AC voltage has a peak-to-peak value of approximately twice the voltage of the DC source. The AC voltage across the primary winding of the transformer induces a stepped up or stepped down voltage (depending upon the turns ratio of the transformer) across the secondary winding of the transformer, which induce voltage is applied across a full wave bridge rectifier so as to charge a capacitor across the bridge output to the desired output voltage level.

Since there is no resistance in the charging path to the capacitor, the latter acts as a peak detector and stores an output voltage which is determined only by the voltage across the primary winding of the transformer and the turns ratio of the transformer. As such, the output voltage of this type of voltage converter is related to the input supply voltage by a constant ratio. This makes it impossible to electronically change the input to output voltage ratio. It thus prevents the voltage-driven converter circuit from varying the output voltage (for a given source voltage), and from compensating for variations in line voltage, or variations due to load regulation. As such, the voltage-driven converter cannot operate as a regulator.

In an effort to overcome some of the shortcomings of the voltage-driven converter, the prior art has developed various current driven inverters. A typical current driven inverter includes a charging capacitor that is placed across the output load rather than being connected directly across the output of the bridge. An inductor is placed in series with the capacitor and forms an integrating circuit in the output path of the diode bridge. As such, the magnitude of the output voltage appearing across the load can be modified by modifying the duration of the circuit pulses produced by diode bridge. The duration of the pulses can, in turn, be controlled by controlling the duty cycle of the driving pulses applied to the transistors. In this manner, the current-driven converter can operate as a regulator.

The primary drawbacks of the prior art current driven DC/DC converter are as follows. Initially, the integrating inductor must be large (and therefore expensive) since it must accommodate all of the DC current and store enough energy at all operating currents to maintain continuous output current flow. Furthermore, its resistance must be adequately low to avoid efficiency degrading losses and thermal problems.

The resonant current driven DC/DC converter regulator of the aforesaid copending application Ser. No. 417,465 comprises an inductor and a capacitor electrically coupled to one another; an input inverter circuit for converting an input DC voltage into an AC voltage having substantially no DC component, with the input inverter circuit applying the AC voltage across the inductor and capacitor in a manner which causes the inductor and capacitor to resonate with one another whereby an AC voltage appears across the capacitor; and an output circuit for converting the AC voltage appearing across the capacitor into a DC output voltage.

The most significant design change incorporated in that resonant current driven DC/DC converter regulator appears to be the introduction of the induction element into the AC arm of a four element transistor bridge defining the input inverter circuit. This eliminates DC flux in the inductor with the exception of unbalanced currents and allows a substantial reduction in the size and rating of the inductor. By providing the inductive element in the AC arm of the inverter circuit, the effect of reactive loads are minimized and the inverter can be readily controlled from the maximum output level down to no load by proper pulse width modulation of the transistors defining the inverter circuit.

As will hereinafter be seen, the resonant current driven converter circuit of copending application Serial No. 417,465 includes a four element transistor bridge, the top and bottom nodes of which receive the source voltage and the left and right nodes of which apply an AC current across the LC resonant circuit. The two lower transistors receive respective square waves which are inverted with respect to one another and which have a frequency $fs=1/Ts$ which defines the frequency of the AC voltage appearing across the LC circuit.

The two upper transistors receive respective pulse width modulated control signals which are inverted with respect to one another and which turn each of the two transistors on during only a portion of a respective half cycle of the switching period Ts. A diode bridge is connected across the capacitor of the LC resonant circuit and transfers energy to an output capacitor located between two nodes of the diode bridge. Whenever the voltage across the resonant capacitor rises to a level equal to that of the power supply output voltage Eo, energy is transferred via the resonant circuit to the output capacitor. By selecting the resonant frequency of the LC circuit to be substantially higher (e.g., two and one-half times) than the switching frequency fs of the two lower transistors, it is possible to control the amount of current supplied to the output capacitor by varying the duty cycle of the pulses applied to the two upper transistors of the transistor bridge. Particularly, the duty cycle of the control pulses applied to the upper transistors varies the magnitude and duration of charging current applied to the output capacitor located in the diode bridge and thereby controls the level of the output voltage Eo. This "product" control of pulse duration and amplitude provides excellent regulation at any current within the device's maximum current capability. The current through the LC circuit has a wave shape approximating a trapezoid and an output characteristic approximating a constant current source. Since the output circuit is effectively being driven by a constant current course, it is intrinsically capable of being short-circuited on the output.

As will hereinafter be seen, in accordance with the instant invention the resonant current driven power source of the aforesaid copending application Ser. No. 417,465 will operate more efficiently, and with lower peak, average and rms currents at lower input supply voltages, particularly where the power levels are high.

In most, if not all regulators, the electrical current from the input power supply is determined by the input power and by the input voltage. Where the supply voltages are low, and the input currents are high, it becomes difficult and/or expensive to efficiently convert power. For example, to convert 10 amperes from a 200 volt supply (2,000 watts) to 1,800 watts output (90% efficiency) is readily achievable. To convert 100 amperes from a 20 volt supply, again 2,000 watts, to 1,800 watts output is more difficult because of the losses, particularly in the semi-conductors, at the higher currents.

BRIEF DESCRIPTION OF THE INVENTION

This invention converts the low voltage, high currents drawn from the input power supply to more desirable higher voltages at lower currents which are favored by inverters. This is achieved by utilizing a step-up transformer having center-tapped primary and secondary windings. The primary and two transistors convert the input DC voltage to a controlled square wave AC voltage that appears in the secondary as a stepped up AC voltage. The latter is applied to the resonating inductor/capacitor combination with the latter capacitor being across the primary of another transformer whose secondary feeds the input of a diode bridge having its output feeding a load.

BRIEF DESCRIPTION OF THE DRAWINGS

For the purpose of illustrating our invention, a presently preferred embodiment is shown in FIG. 6 of the drawings, it being understood, however, that the invention is not limited to the precise arrangements and instrumentalities shown.

FIG. 2 is a graph illustrating a series of wave forms on a common time line, which wave forms are used to describe the operation of the circuit of FIG. 1A.

FIG. 3 is a graph illustrating a series of wave forms further illustrating a second mode of operation of the circuit of FIG. 1A.

FIG. 6 is a circuit diagram illustrating the circuit of FIG. 1A modified to include the present invention.

DETAILED DESCRIPTION OF THE DRAWINGS

Figure 1A:
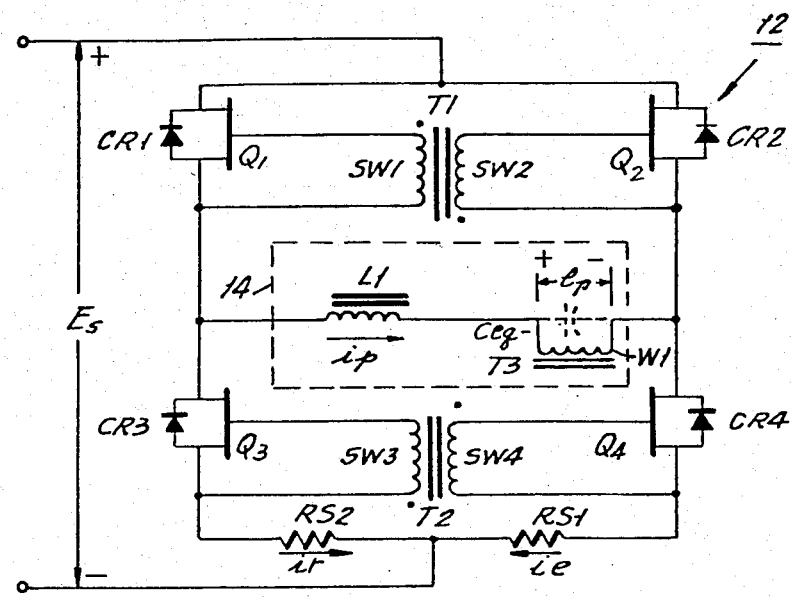
FIG. 1A is a circuit diagram of a resonant current-driven DC/DC converter regulator constructed in accordance with the teachings of the aforesaid application Ser. No. 417,465, filed Sept. 13, 1982.
Figure 1B:
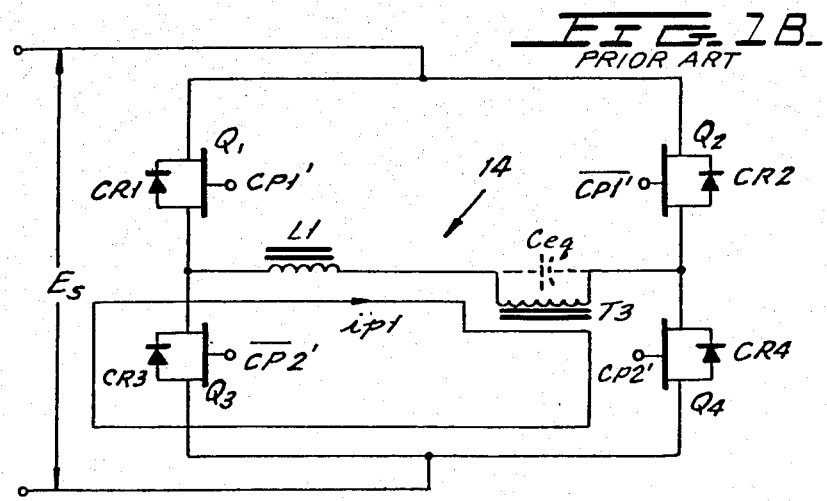
FIGS. 1B-1D are circuit diagrams of the input portion of the circuit of FIG. 1A and illustrate the current flow through this circuit during various portions of the transistor switching cycle.
Figure 1C:
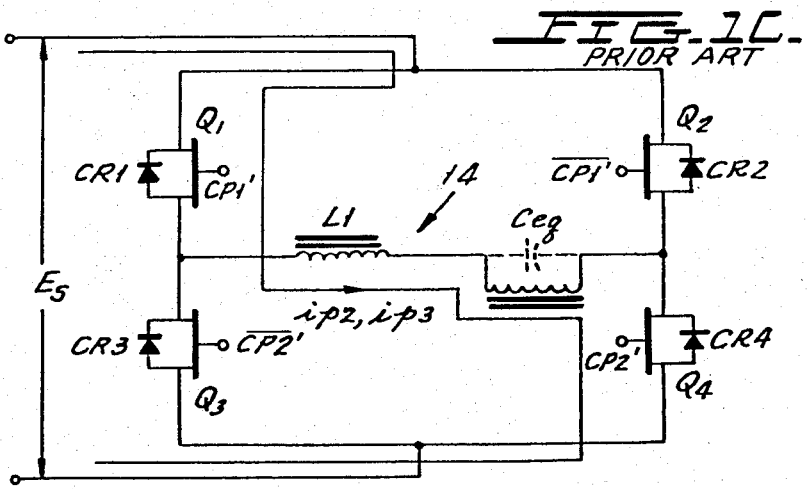

Referring now to FIGS. 1A through 5, wherein like numerals indicate like elements, there is shown in FIG. 1A a resonant current-driven DC/DC converter regulator constructed in accordance with the principles of the invention in the aforesaid copending application Ser. No. 417,465 and designated generally as 10. Power source 10 includes an input inverter circuit 12 which converts a DC input signal Es input an AC signal, an LC circuit 14, across which the AC signal is applied, and an output circuit 16 which converts an AC voltage appearing across the primary winding W1 of transformer T3 into a DC voltage Eo.

While input inverter circuit 12 may take any form desired, it preferably includes four high-speed mosfet transistors Q1–Q4, each of which inherently includes a respective substrate diode CR1–CR4 across its drain and source. While field effect transistors are preferred for reasons noted below, any other type of switching transistor may be utilized. In such a case, discrete diodes must be used in lieu of the substrate diodes CR3–CR4 (diodes CR1 and CR2 are not necessary to the proper operation of the circuit).

Figure 4:
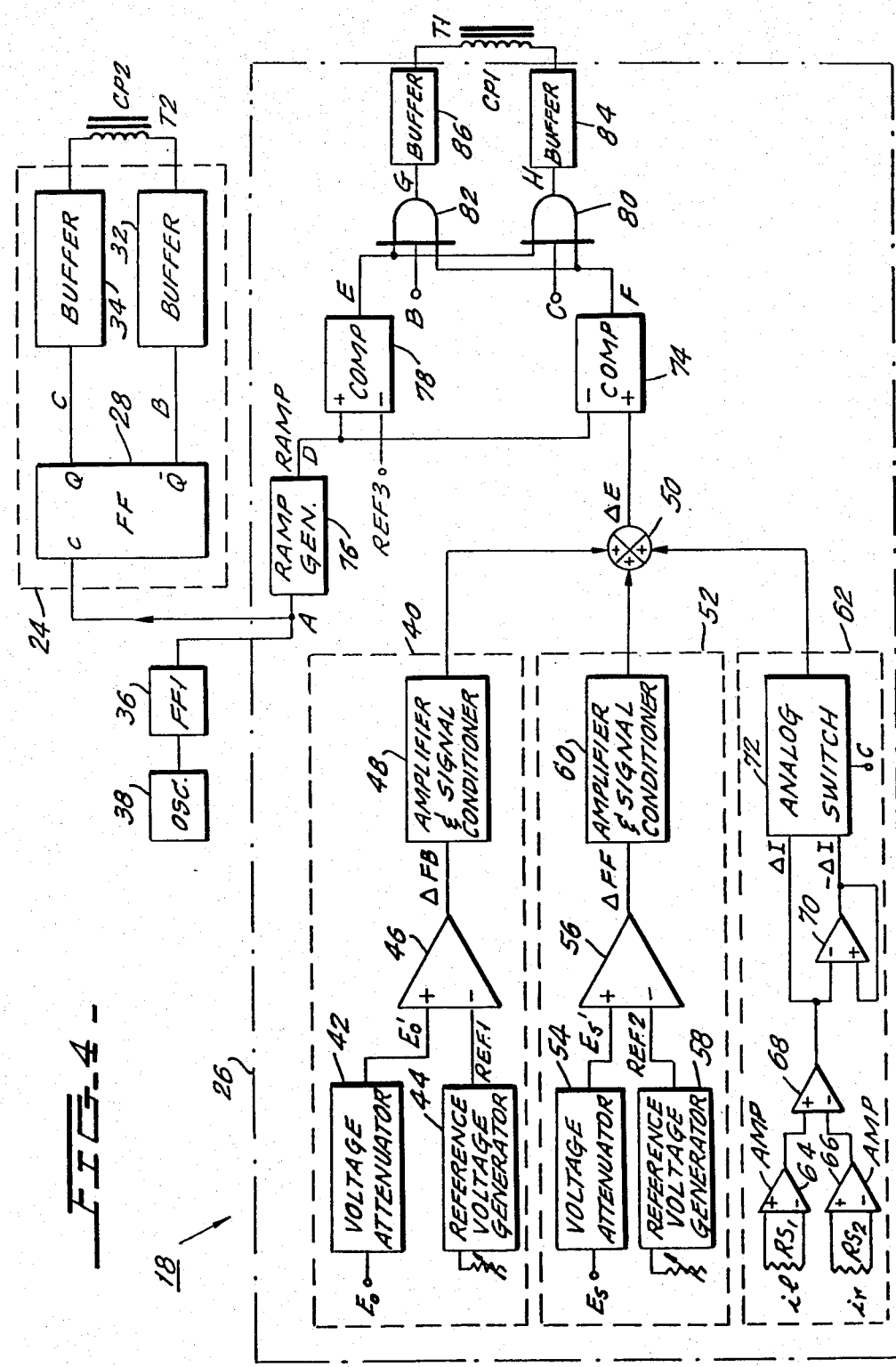
FIG. 4 is a block diagram illustrating the control signal generator circuit of FIG. 1A.

The switching operation of transistors Q1–Q4 is controlled by a control signal generating circuit 18 whose structure is shown in FIG. 4 and will be described in some detail below. It is sufficient at this point to note that control signal generating circuit 18 generates control signals CP1, CP2 which are applied to the primary windings of transformers T1 and T2, respectively, and control the operation of transistors Q1–Q4.

The gates of transistors Q1 and Q2 are connected to respective secondary windings SW1, SW2 of transformer T1, which windings have a reverse polarity as shown. As a result, a positive going pulse applied to the primary winding PW1 of transformer T1 turns transistor Q1 on and transistor Q2 off while a negative pulse applied to the primary winding PQ1 of transformer T1 turns transistor Q2 on and transistor Q1 off.

The gates of transistors Q3 and Q4 are connected to respective secondary windings SW3, SW4 of a second transformer T2, which windings have a reverse polarity as shown. As a result, transistor Q4 will be turned on and transistor Q3 will be turned off by a positive pulse applied to the primary windings PW2 of transformer T2 while transistor Q3 will be turned on and transistor Q4 will be turned off by a negative pulse applied to the primary winding PW2 of transformer T2.

The control signal CP2 takes the form illustrated in line A of FIG. 2. As shown therein, control signal CP2 is a square wave having a period Ts and a frequency $fs = 1/Ts$. This frequency is the switching frequency of transistors Q3 and Q4 and defines the frequency of the AC wave form appearing across the primary winding of transformer T3.

The control signal CP2 is applied to the primary winding PW2 of transformer T2 and induces control signals CP2' and CP2' in the secondary windings SW3 and SW4, respectively, of transformer T2. These signals are applied to the respective gates of transistors Q3 and Q4 and turn these transistors on during alternate half periods of the switching cycle.

The control signal CP1 takes the general form illustrated in line D of FIG. 2 and includes a positive going pulse during a portion of the first half of each period Ts and a negative going pulse during a portion of the second half of each period Ts. As will be explained in greater detail below, the duration and position with respect to control signal CP2 of each positive and negative going pulse of the control signal CP1 is varied by control circuit 18 to regulate the magnitude of the output voltage Eo. The control signal CP1 is applied to the primary winding PW1 of transformer T1 and induces control signals CP1' and CP1' in the secondary windings SW1, SW2, respectively, of transformer T1. These control signals are applied to respective gates of transistors Q1 and Q2 and cause transistors Q1 and Q2 to turn on during selected portions of alternating half cycles of the switching period Ts. As will be described in greater detail below, the timing of the leading and trailing edges of each pulse CP1', CP1' controls the magnitude and duration of current pulses applied to output capacitor C1 of output circuit 16 and thereby controls the magnitude of the output voltage Eo.

LC circuit 14 defines a resonant circuit having a resonant frequency fr which is greater than the switching frequency fs defined by control signal CP2. The resonant frequency fr is preferably approximately 2½ times the switching frequency fs and may be defined as:

$$fr = \frac{1}{2\pi \sqrt{L1\, Ceq}} \quad \text{(Eq. 1)}$$

wherein L1 is the inductance of inductor L1 and Ceq is the capacitance of the equivalent capacitor Ceq appearing across the primary winding of transformer T3. Equivalent capacitor Ceq is defined by the stray capacitance on both the primary and secondary windings of transformer T3 and any capacitance appearing in the output circuit 16 on the transformer side of rectifier bridge 20 which is reflected back to the primary winding of transformer T3. Since the stray capacitance alone is not normally sufficiently high to cause the resonant frequency fr to reach the desired value, a capacitor C2 is placed across the secondary winding of transformer T3. This capacitor is reflected to the primary winding of transformer T3 and forms part of the equivalent capacitance Ceq. Alternatively, capacitor C2 may be placed across the primary winding of transformer T3.

The operation of power circuit 10 can best be understood with reference to the wave forms of FIG. 2 and to the circuit diagrams of FIGS. 1A–1D. At the beginning of each switching cycle (at time $t_o$ of FIG. 2), capacitor Ceq is charged to $-Ep$ volts where:

$$Ep = \frac{1}{N} Eo \quad \text{(Eq. 2)}$$

and N is the turns ratio of transformer T3.

During the first portion of this half cycle of the switching period Ts, the control signals CP2', CP2' are applied to respective gates of transistors Q4, Q3 thereby driving transistor Q4 into saturation and shutting transistor Q3 off. In this condition, the charge across capacitor Ceq causes a resonant current ip1 to flow through inductor L1, substrate diode CR3 and transistor Q4 in the direction shown in FIG. 1B. This resonant current flow torwards a maximum value:

$$ip1_{max} = \frac{Ep}{Zo} \quad \text{(Eq. 3)}$$

wherein Zo is the impedance of LC circuit 14 and is defined as:

$$Zo = \sqrt{L1/Ceq} \quad \text{(Eq. 4)}$$

The resonant current will rise toward $ip1_{max}$ at the resonant frequency fr defined in equation (1), supra. Simultaneously, the voltage across capacitor Ceq will begin rising from $-Ep$ towards $+Ep$. At time $t_1$ (see FIG. 2), control signal CP1' is applied to the gate of transistor Q1 causing transistor Q1 to turn on. This enables the current ip2 to flow through the path illustrated in FIG. 1C and effectively adds another step function having a magnitude Es to the LC circuit 14. As a result, a second resonant current illustrated by dash lines 22 in line H of FIG. 2 will be added to the LC circuit 14. This causes the current ip2 to rise at a faster rate towards $2ip1_{max}$ and causes the voltage $e_p$ across capacitor Ceq to rise at a faster rate toward the value $2Es+Ep$. See lines G and H of FIG. 2.

At time t2, the voltage across capacitor Ceq will reach the value Ep at which diode bridge 20 turns on. Once diode bridge 20 begins conducting, the charging capacitor C1 is reflected back across the primary winding of transformer T3. Since the capacitance of capacitor C1 is substantially greater than the equivalent capacitor Ceq, substantially all of the current Ip3 through inductor L1 flows through the primary winding of transformer T3. This current will induce a charging current ic (see line I of FIG. 2) in the secondary winding of transformer T3. The charging current is applied both to the load Ro and to the charging capacitor C1. This current will be integrated by capacitor C1 and will charge capacitor C1 to the desired output value Eo.

Assuming that the source voltage Es and the output voltage Eo remain constant (except for ripple voltage) during the half period of the switching cycle, the voltage across capacitor Ceq will remain at a constant value Ep and all the energy (less circuit losses) flowing through inductor L1 will be transferred to charging capacitor C1 and the load Ro. As long as the voltage across capacitor Ceq remains at Ep and current continues to flow through inductor L1, energy will be transferred to capacitor C1.

Figure 1D:
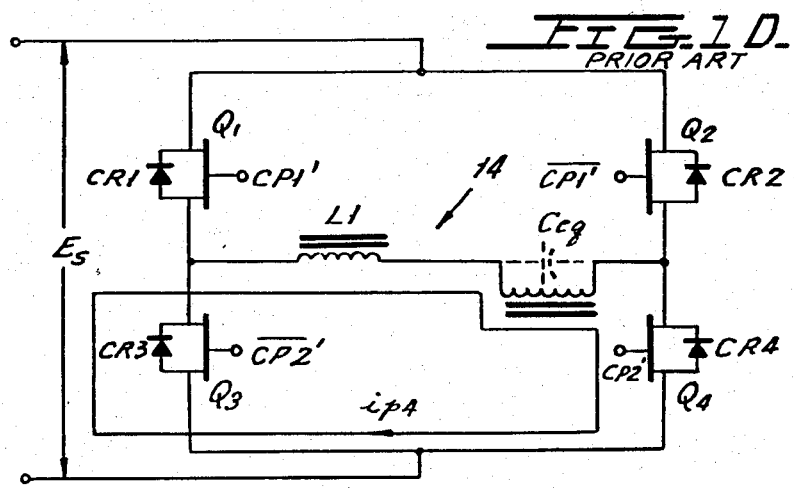

At time t3, the control signal CP1' applied to the gate of transistor Q1 drops to 0 v thereby turning transistor Q1 off. At that point, the current ip4 continues to flow through transistor Q3 and substrate diode CR4 as illustrated in FIG. 1D and in line H of FIG. 2. During this period, all of the energy in inductor L1 is transferred to the load Ro and to charging capacitor C1 at a decay rate of Ep/L1. When current ip4 reaches 0, substrate diode CR3 prevents the current ip from reversing thereby stopping the current flow. This, in turn, causes diode bridge 20 to stop conducting and the charging current ic falls to 0. See line I of FIG. 2. There is then a dead period t5 during which no current flows through inductor L1.

During this interval, the voltage across capacitor Ceq remains at Ep. This is the only energy left stored in the circuit and is used to reverse the polarity of the voltage across capacitor Ceq during the first portion of the next half cycle of the switching period Ts during which the transistor Q3 is on and the remaining transistors are off. See line G of FIG. 2. The operation of the converter circuit during the second half of each switching period Ts is identical to that of the first half of the cycle except the transistors Q2 and Q3 are turned on and the wave forms are inverted as shown in FIG. 2.

Among the advantages of current driven DC/DC converter circuit 10 is the fact that the integrating inductor L1 is located in an AC branch of the circuit and is not required to carry any substantial DC current. Additionally, by properly designing the control signal generating circuit 18, the input inverter circuit 12 can be operated in such a manner that substantially no DC current flows through inductor L1. Since inductor L1 need not carry any substantial DC current, its size and cost can be substantially reduced compared to the integrating inductor L of the prior art.

Another advantage of converter circuit 10 lies in the fact that the resonating circuit itself reverses the polarity of the voltage ep across the primary winding of transformer T3 during alternate half cycles. In prior art circuits that preceded converter circuit 10, the volt-ampere supplied by the switching transistors to reverse the polarity of the charge on the stray capacitors which are reflected across the primary winding of transformer T3 created substantial losses which are at least partially avoided by the present invention.

The current driven operation serves to minimize the transient switching current required from the transistors Q1-Q4 and results in wave forms at the output rectifiers D1-D4 which have very slow rise and fall time transition for the switching frequency fs. The lower transient switching currents in the output rectifiers minimize switching losses and thereby maximize efficiency. Low switching transients and associated lower losses also permit a higher frequency of operation. This makes it possible to use faster switching power mosfet transistors which permit further reduction in weight and volume.

Yet another advantage of converter circuit 10 resides in the fact that by varying the duty cycle of transistors Q1 and Q2, both the magnitude and duration of the charging current ic can be controlled. This "product" control results in good regulation at any current within the device's maximum current capability.

In the control circuit 18 described below, each positive and negative going pulse of the control signal CP1 is symmetrical within its respective half cycle. It should be recognized at this point that the leading edge of the control pulse has a greater effect on the output voltage Eo than does the trailing edge. Thus, the leading edge of the control pulse determines how quickly the voltage ep rises to the maximum value Ep and thereby affects both the magnitude and duration of the charging current ic. The trailing edge of the pulses of control signal CP1 only affects the duration of the charging current ic and does not effect its magnitude.

In view of the foregoing, it would be advantageous to modify the control circuit 18 so that the leading and trailing edges of the control pulses CP1 are independently controlled. The leading edge of the control pulses CP1 would serve as a coarse control for the circuit while the trailing edges would serve as a fine control over the output power. An appropriate modification on the control circuit 18 to serve this function is well within the skill of one of ordinary skill in the art.

Still another advantage of converter circuit 10 resides in the fact that circuit 10 can be operated at from substantially no load to full rated load. Operation at no load can best be understood with reference to FIG. 3. In this mode of operation, control pulses CP1' are delayed until after one-half of the resonating period Tr with the result that a sinusoidal current ip1 will flow in the direction illustrated in FIG. 3B. After one-half of the resonating period Tr, the current ip will attempt to reverse direction but is unable to do so due to the polarity of substrate rectifier CR3 (Q3 is off). During this period, the voltage across capacitors Ceq will rise from −Ep to slightly less than +Ep due to circuit losses. Since the voltage across capacitor Ceq never rises above Ep, diode bridge 20 will never be turned on and no energy will be transferred to the charging capacitor C1. At time t6, the control signal CP1' is applied to the gate of transistor Q1 turning transistor Q1 on for a short interval sufficient to restore circuit losses and bring the voltage across capacitor Ceq up to, but not above, Ep.

Circuit operation during the next half cycle of the switching period Ts is the same as but inverse to that during the first half cycle. In this manner, converter 10 is able to operate at no load without the need for any large inductors or bleeder resistors as are required in the prior art. Where the output voltage Eo required is within an approximate range of one-half to two times the source voltage Es, and where the source voltage Es can float (such as a battery), transformer T3 can be eliminated and replaced with a small value capacitor Ceq. Such a circuit can be used as a lightweight transformerless buck-boost DC/DC converter regulator.

The structure and operation of control signal generating circuit 18 will now be described with reference to FIGS. 4 and 5. As shown in FIG. 4, control signal generator circuit 18 comprises two primary subcircuits: a switching cycle pulse generator circuit 24 and a power control pulse generator circuit 26.

Switching cycle pulse generator circuit 24 generates the control pulse CP2 which defines the switching period of transistors Q3, Q4 (and thereby the frequency of the AC signal through LC circuit 14). Pulse generator circuit 24 includes a flip-flop 28 and a pair of buffer circuits 32, 34 connected to the $\overline{Q}$ and Q outputs of flip-flop 28, respectively. The clock input of flip-flop 28 receives a square wave (see line A of FIG. 5) having a frequency 2 fs which is generated by flip-flop 36 in response to a square wave generated by oscillator 38 (such as a 555 timer) having a frequency 4 fs. can be manually controlled (such as by a potentiometer) and determines the desired value of the output voltage Eo. In some applications, it will be preferable for reference voltage generator 44 to automatically generate either a constant or varying reference voltage REF1.

Difference amplifier 46 compares the magnitudes of the attenuated voltage signal Eo' and the reference voltage REF1 and generates a feedback error signal ΔFB at its output. This signal is amplified and its frequency response is conditioned by amplifier and signal conditioner 48 whose output is applied to one input of adder 50.

A second input of adder 50 receives the output of feed forward signal generator circuit 52. This circuit monitors the value of the supply voltage Es and compares it to a reference signal indicative of the nominal value of Es and generates an error signal ΔFF indicative of the difference between these values. To this end, feed forward signal generator circuit 52 includes a voltage attenuator 54 which attenuates the supply voltage Es and applies an attentuated voltage Es' to the non-inverting input of difference amplifier 56. The remaining input of difference amplifier 56 receives a second reference voltage REF2 which is generated by voltage generator 58. The magnitude of the reference voltage REF2 may be manually set, such as by a potentiometer, and indicates the nominal value of the source voltage Es.

Difference amplifier 56 compares the signals at its input and generators a feed forward error signal FF which is indicative of the difference between the actual and nominal value of the supply voltage Es. This signal is applied to amplifier and signal conditioner circuit 60 where it is amplified and its frequency response is conditioned and it is then then applied to a second input of analog adder 50.

Figure 5:
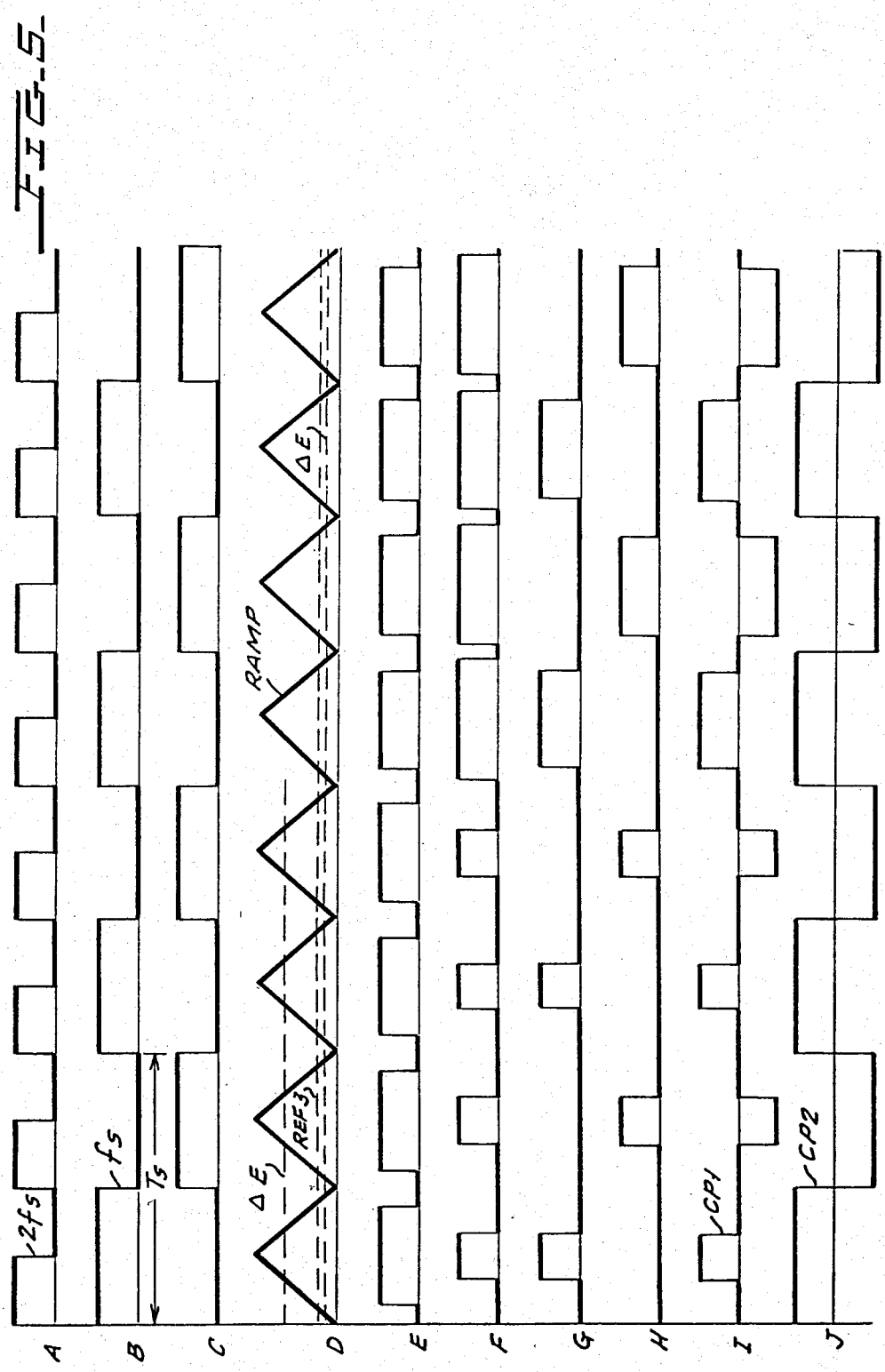
FIG. 5 is a graph illustrating a plurality of wave forms on a common time line, which wave forms appear in various points in FIG. 4.

A third input to adder 50 is generated by current sensing control circuit 62 which generates an error signal indicative of the difference between the left and right current il and ir flowing through inductor L1 during alternate The output of flip-flop 36 is applied to the clock input of flip-flop 28 causing its outputs to switch between the binary high and low values in the manner shown in lines B and C of FIG. 5. The Q and $\bar{Q}$ output of flip-flop 28 are 180° out of phase, and are applied to buffer circuits 32, 34 (which may be clock drivers such as the MH0026). As a result, the control signal CP2 is induced across the primary winding of transformer T2. See line J of FIG. 5.

As noted above, the duty factor of control signal CP1 determines the output power applied to output capacitor C1. In order to properly regulate the output voltage Eo, the duty factor of the control signal CP1 should be increased whenever it is necessary to increase the output voltage Eo and should be decreased when it is necessary to decrease the output voltage Eo. In this manner, control circuit 18 can compensate for load regulation. Additionally, control circuit 18 can ensure that the output voltage Eo remains at the desired level even if the input voltage Es fluctuates. Particularly, control circuit 18 can monitor the level of the input voltage Es and increase or decrease the duty cycle of control signal CP1 in response to falling or rising supply voltages, respectively. Finally, control circuit 18 can also ensure that substantially no DC current flows through LC circuit 14 by monitoring the current during alternate half cycles of the switching period and varying the current flow accordingly.

Control over the output voltage Eo is provided by feedback signal generator circuit 40 which comprises a voltage attenuator 42, a reference voltage generator 44, a difference amplifier 46 and an amplifier and signal conditioner 48. Voltage attenuator 42 receives the output voltage Eo and generates an attenuated signal Eo' which is proportional thereto. This signal is compared to a reference signal REF1 generated by reference voltage generator 44 in difference amplifier 46. The magnitude of the reference voltage REF1 half cycles of the switching periods Ts. This signal provides an indication of any DC component in LC circuit 14 and is used by control circuit 16 to reduce the DC component toward zero.

To this end, current control sensing circuit 62 includes a pair of difference amplifiers 64, 66 across whose inputs are connected respective sensing resistors Rs1, Rs2. These resistors appear in the bottom lines of the transistor bridge of FIG. 3A and have the current il and ir, respectively, flowing through them. These resistance values are extremely low and, therefore, do not effect the operation of inverter circuit 12. The output of amplifiers 64 and 66 will be respective voltages indicative of the left and right currents il, ir, respectively. These signals are applied to respective inputs of difference amplifier 68 which generates a positive error signal ΔI. This signal is applied to the inverting input of a second amplifier 70 which is connected in the manner shown to operate as an inverting amplifier. As a result, the output of amplifier 70 will be a negative error signal −ΔI.

The positive error signal ΔI must be applied to adder 50 during the first half of each cycle of the switching period ts so as to adjust the duty cycle of the control signal CP1' applied to the gate of transistor Q1. The negative error signal −ΔI must be applied to the adder 50 during the second half cycle of each switching period Ts so as to adjust the duty cycle of the control signal $\overline{CP1}$' applied to transistor Q2. To this end, the error signals ΔI and −ΔI are applied to an analog switch 72 which is gated by the signal C appearing at the output of flip-flop 28.

The output of adder 50 is an error signal ΔE which is applied to the non-inverting input terminal of comparator 74 which compares the error signal ΔE to a ramp signal RAMP generated by ramp generator 76. The ramp generator 76 is connected to the output of flip-foop 36 (see line A of FIG. 5) and integrates the square wave appearing at the output of flip-flop 36. As such, the output of ramp generator 68 will integrate to a maximum value during the first half of each half cycle of the switching period and will integrate down to zero during the second half of each half period of the switching period Ts. The resultant wave form is illustrated in line D of FIG. 5.

Comparator 74 compares the error signal ΔE to the ramp signal RAMP and generates a binary high at its output whenever the error signal ΔE is greater than the RAMP signal and a binary low at its output at all other times. See lines D and F of FIG. 5. As will be understood by those of ordinary skill in the art, the error signal ΔE will rise and fall as a function of the required output and the supply voltage. Whenever additional charge must be added to the output capacitor C1 to increase the output voltage Eo to the desired level, the error signal ΔE will go down towards zero thereby increasing the duty factor of the pulses generated by comparator 74. See line F of FIG. 5. As the output voltage increases beyond the desird value, or the source voltage increases above its nominal value, the servo loop will act so as to increase ΔE to thereby decrease the duty cycle of the pulses generated by comparator 74. The foregoing operation is illustrated in lines D and F of FIG. 5 wherein ΔE is initially presumed to be high (indicating that the charge to be added to the output capacitor C1 is to be reduced) and ΔE is thereafter presumed to be low (indicating that increased charge must be supplied to the output capacitor C1).

The output of comparator 74 is applied to AND gates 80, 82 which are gated by signals B and C appearing at the output of flip-flop 28. The output of AND gates 80, 82 are applied to buffer circuits 84, 86, respectively, which may take the same form as buffer circuits 32, 34.

In the preferred embodiment, AND gates 80, 82 also receive the output of comparator 78 which defines a dead time during the transistors Q1, Q2 must be off. As explained above, this dead time is desired in order to ensure that no current is flowing through inductor L1 at the beginning of each successive half cycle of the switching period Ts. It is preferred that this dead time be approximately 15% of the switching period Ts. To this end, comparator 78 compares the ramp signal RAMP to a reference voltage REF3 which is illustrated in line D of FIG. 5. As a result, comparator 78 will gate AND gates 80, 82 during all but 15% of each successive half cycle of the switching period Ts.

As long as the error voltage E is greater than the reference voltage REF 3, the pulses appearing at the output of comparator 74 will be narrower than the dead time pulses appearing at the output of comparatory 78. In such a case, the control signal CP1 will not be affected by the dead time pulses. See the first two switching periods of FIG. 5.

Whenever the error signal ΔE falls below the reference signal REF3, the pulses generated by comparator 74 will have a greater pulse width than the dead time pulses generated by comparator 78. As such, the duty cycle of the control signal CP1 will be limited by the dead time pulses. See the last two switching periods of FIG. 5.

In the circuit of FIG. 1A, power source 12 is shown as a DC to DC converter regulator. If desired, the circuit can be modified for operation as a DC to AC inverter. As will be apparent to those skilled in the art, it will then be necessary to substitute the diode bridge with a demodulator in a known manner to produce the desired AC output.

Now referring more particularly to FIG. 6 illustrating input inverter circuit 100 which is input inverter circuit 12 modified to incorporate the instant invention. Like elements in FIGS. 6 and 1A are identified by the same reference numerals. The basic difference between inverter circuits 12 and 100 is that the latter is provided with step-up transformer T4 having center tapped primary and secondary windings 98, 99, respectively, the turns ratio between windings 98 and 99 being the ratio of input supply voltage Es to the desired bridge operating voltage Ec. Further, rectifiers CR1 and CR2 of inverter 100 are discrete elements, whereas for inverter 12 these elements may have been integral with the respective transistors Q1 and Q2. In inverter circuit 100 transistors Q1 and Q2 are selected for high current handling ability so that, if required, the control transformer that includes secondary windings SW1 and SW2 is modified to reflect changed input characteristics of transistors Q1 and Q2.

More particularly, inverter circuit 100 converts DC input voltage Es applied between terminals 80, 90 to an AC signal that is applied to LC circuit 14. Terminal 89 is connected by jumper 101 to center tap 96 of primary 98, one section of which is connected through the emitter collector power circuit of transistor Q1 to node 95 that is connected by jumper 102 to input terminal 90. The other section of primary 98 is connected through the emitter collector circuit of transistor Q2 to node 95. Secondary windings SW1 and SW2 are connected from node 96 to the control electrodes of the respective transistors Q1 and Q2. LC circuit 14 extends between nodes 91 and 92. One section of secondary 99 is connected through diode CR1 to node 91 and the other section of secondary 99 is connected through diode CR2 to node 92. The main current carrying portion (drain-source) of transistor Q3 extends between nodes 91 and 94 while the main current carrying portion of transistor Q4 extends between nodes 92 and 94. Secondary windings SW3 and SW4 extend from node 94 to the control electrodes of the respective transistors Q3 and Q4, and jumper 93 extends from node 94 to center tap 97 of secondary 99.

The basic difference between the circuits of FIGS. 1A and 6 is that in the latter, conduction of transistors Q1 and Q2 is controlled in a manner such that an AC voltage is impressed on center-tapped primary 98. This voltage is stepped up by the turns ratio between primary and secondary 98, 99 and is applied through diodes CR1 and CR2 in cooperation with transistors Q3 and Q4 to resonant LC circuit 14. The control of transistors Q1 through Q4 is basically the same in the circuits of FIGS. 1A and 6.

In both FIGS. 1A and 6, transistors Q1 and Q2 are parts of an H bridge and are pulse width modulated. In the circuit of FIG. 6, discrete element rectifiers CR1 and CR2 provide isolation and also rectify the output of transformer T4 for application to LC circuit 14. Typically, input DC voltage Es applied to input inverter 100 will be say 10, 12 or 28 volts, and the resonating inductor L1 and resonating capacitor Ceq are proportioned to operate above 100 volts where relatively high operating efficiencies are obtainable.

The present invention may be embodied in other specific forms without departing from the spirit or essential attributes thereof and, accordingly, reference should be made to the appended claims, rather than to the foregoing specification as indicating the scope of the invention.

What is claimed is:

1. A power source comprising:
   an LC circuit including an inductor and a capacitor electrically coupled to one another;
   an input inverter circuit for converting an input DC voltage into an AC voltage having substantially no DC components, said input inverter circuit applying said AC voltage across said LC circuit in a manner which causes said inductor and capacitor to resonate with one another, a resonant AC voltage thereby appearing across said capacitor; and
   an output circuit for applying power from said inverter circuit to a load;
   said input inverter including a step-up transformer having a center-tapped primary to which said DC voltage is applied and having a center-tapped secondary through which said AC voltage is applied across said LC circuit for stepping up the input DC voltage to improve the operating efficiency of the power source for low input voltages.

2. A power source as set forth in claim 1, wherein said input inverter includes primary transistors in circuit with said primary;
   a bridge including opposite first and second nodes and opposite third and fourth nodes;
   said inductor and said capacitor being connected between said first and second nodes;
   said bridge including secondary transistors connected between said fourth node and said first and second nodes;
   said secondary having its center-tap connected with said third node;
   said bridge also including rectifier elements through which opposite sections of said secondary are connected to said first and second nodes; and
   a control circuit for controlling time periods during which said transistors are on and off.

3. A power source as set forth in claim 2, wherein said AC voltage across said LC circuit causes current pulses of opposite polarity to flow through said inductor during respective half cycles of said AC voltage and wherein energy is transferred to said capacitor during that portion of each half cycle of said AC voltage during which said rectifier circuit is not conducting and is transferred to said output load during that portion of each half cycle of said AC voltage during which said rectifier circuit is conducting.

4. A power source as set forth in claim 3, wherein said control circuit operates said transistors in a manner which varies the magnitude and duration of said current pulses so as to control the magnitude of said output voltage.

5. A power source as set forth in claim 4, wherein said control circuit varies the operation of said transistors as a function of the difference between the desired and the actual output voltage across said output load.

6. A power source as set forth in claim 5, wherein said control circuit controls the operation of said transistors in a manner which attempts to reduce any DC current through said LC circuit to zero.

7. A power source as set forth in claim 6, wherein said control circuit controls the operation of said transistors as a function of the difference between a predetermined input voltage and the actual input voltage.

8. A power source as set forth in claim 4, wherein said control circuit operates said transistors in a manner which independently adjusts the leading and trailing edges of each of said current pulses.

9. A power source as set forth in claim 2, wherein there is a jumper extending between said third and fourth nodes.

10. A method for regulating a DC voltage, comprising the steps of:
converting an input DC voltage into an AC voltage having substantially no DC components and applying said AC voltage across an LC circuit including an inductor and a capacitor electrically coupled to one another;
converting said AC voltage appearing across said capacitor into a DC output voltage for supplying said DC output voltage to a load; and
prior to applying said AC voltage across said LC circuit, stepping said AC voltage up to a level substantially greater than the level of said input DC voltage to improve the operating efficiency of the power source for low input voltages.

11. The method of claim 10, wherein energy is transferred from said LC circuit to said output load only when the voltage across said capacitor is greater than a value determined by the output voltage across said output load.

12. The method of claim 1, wherein said AC voltage across said LC circuit causes current pulses of opposite polarity to flow through said inductor during respective half-cycles of said AC voltage and wherein energy is transferred to said capacitor during that portion of each half-cycle of said AC voltage during which energy is not being transferred to said output load.

13. The method of claim 12, further including the step of varying the magnitude and duration of said current pulses so as to control the magnitude of said output voltage.

14. The method of claim 13, wherein the magnitude and duration of said current pulses are varied as a function of the difference between the desired and the actual output voltage across said output load.

15. The method of claim 14, wherein the magnitude and duration of said current pulses are controlled in a manner which attempts to reduce any DC current through said LC circuit to zero.

16. The method of claim 15, wherein the magnitude and duration of said current pulses are controlled as a function of the difference between a predetermined input voltage and the actual input voltage.

17. The method of claim 13, wherein the leading edge of each of said current pulses is adjusted independently of the trailing edges of said current pulses.

18. A power source, comprising:
an LC circuit including an inductor and a capacitor electrically coupled to one another; said LC circuit having a resonant frequency determined by said inductor and capacitor;
a switching circuit for switching current flow through said LC circuit at a switching frequency which is lower than said resonant frequency, said switching circuit permitting current flow through said LC circuit only in a single direction during each half cycle of said switching frequency;
an output transformer having a primary and a secondary winding; said capacitor being coupled only in parallel with said primary winding;
an output circuit coupled to said secondary winding for applying power to a load;
a power input circuit for receiving a DC voltage and converting it to an AC voltage and applying said AC voltage to said LC circuit during a portion of each half cycle of said switching frequency, the polarity of said AC voltage being reversed for each successive half cycle of said switching frequency so as to cause an AC current flow through said LC circuit;
said input circuit including an input transformer having a center-tapped primary to which said DC voltage is applied and having a center-tapped secondary through which said AC voltage is applied across said LC circuit; the level of said AC voltage being changed by the input transformer to improve the operating efficiency of the power source for low input voltages; and
a control circuit for controlling the operation of said power input circuit by adjusting the portion of each said half cycle during which said AC voltage is applied to said LC circuit so as to adjust the output voltage applied to said load.

19. A method for regulating a DC voltage in a power source including an LC circuit having an inductor and a capacitor electrically coupled to one another, said LC circuit having a resonant frequency determined by said inductor and capacitor, an output transformer having a primary and a secondary winding, said capacitor being coupled only in parallel with said primary winding, an output circuit coupled to said secondary winding for applying an output voltage to a load, said method comprising the steps of:
controlling current flow through said LC circuit at a switching frequency which is lower than said resonant frequency in such a manner that current is permitted to flow through said LC circuit only in a single direction during each half cycle of said switching frequency;
converting said DC voltage to an AC voltage and applying said AC voltage to said LC circuit during a portion of each half cycle of said switching frequency, the polarity of said AC voltage being reversed for each successive half cycle of said switching frequency so as to cause an AC current flow through said LC circuit;

prior to applying said AC voltage to said LC circuit, changing the level of said AC voltage to a level different from that of said DC voltage to improve the operating efficiency of the power source for low input voltages; and adjusting the portion of each said half cycle during which the AC voltage is applied to said LC circuit so as to adjust the output voltage applied to said load.

20. A power source comprising:

and LC circuit including an inductor and a capacitor electrically coupled to one another;

an input inverter circuit for converting an input DC voltage into an AC voltage having substantially no DC components, said input inverter circuit applying said AC voltage across said LC circuit in a manner which causes said inductor and capacitor to resonate with one another, a resonant AC voltage thereby appearing across said capacitor; and an output circuit for applying power from said inverter circuit to a load;

said input inverter including a transformer having a center-tapped primary to which said DC voltage is applied and having a center-tapped secondary through which said AC voltage is applied across said LC circuit for changing the level of said AC voltage to a level different from the level of said DC voltage to improve the operating efficiency of the power source for low input voltages.

21. A method for regulating a DC voltage, comprising the steps of:

converting an input DC voltage into an AC voltage having substantially no DC components and applying said AC voltage across an LC circuit including an inductor and a capacitor electrically coupled to one another;

converting said AC voltage appearing across said capacitor into a DC output voltage for applying said DC output voltage to a load; and prior to applying said AC voltage across said LC circuit, changing the level of said AC voltage to a level different from the level of said DC voltage to improve the operating efficiency of the power source for low input voltages.

* * * * *